(12) United States Patent
Pallister (10) Patent No.: US 7,133,047 B2
(45) Date of Patent: Nov. 7, 2006

(54) METHOD AND MECHANISM FOR PROGRAMMABLE FILTERING OF TEXTURE MAP DATA IN 3D GRAPHICS SUBSYSTEMS

(75) Inventor: Kim Pallister, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/872,049

(22) Filed: Jun. 18, 2004

(65) Prior Publication Data

US 2005/0140689 A1 Jun. 30, 2005

Related U.S. Application Data

(63) Continuation of application No. 10/747,966, filed on Dec. 29, 2003.

(51) Int. Cl.
*G09G 5/00* (2006.01)
(52) U.S. Cl. ............... 345/582; 345/503; 345/506; 345/552; 345/559; 345/611; 382/260
(58) Field of Classification Search ........ 345/606–610, 345/613, 614
See application file for complete search history.

(56) References Cited

U.S. PATENT DOCUMENTS

| | | | |
|---|---|---|---|
| 4,835,712 A | 5/1989 | Drebin et al. | |
| 4,897,806 A | 1/1990 | Cook et al. | |
| 5,025,400 A | 6/1991 | Cook et al. | |
| 5,239,624 A | 8/1993 | Cook et al. | |
| 6,333,743 B1 | 12/2001 | Gossett et al. | |
| 6,366,290 B1* | 4/2002 | Dye et al. | 345/582 |
| 6,452,603 B1 | 9/2002 | Dignam | |
| 6,731,296 B1* | 5/2004 | Lewis et al. | 345/582 |
| 6,867,778 B1* | 3/2005 | Tang et al. | 345/441 |
| 6,999,100 B1* | 2/2006 | Leather et al. | 345/611 |
| 2003/0234791 A1 | 12/2003 | Boyd et al. | |
| 2004/0227765 A1* | 11/2004 | Emberling | 345/582 |

FOREIGN PATENT DOCUMENTS

WO WO02/103633 12/2002

OTHER PUBLICATIONS

"Sate Machines", Dave Thomas, Andy Hunt, IEEE Software, vol. 19, No. 6, pp. 10-12, Nov./Dec. 2002.*
Sugita, Kaoru, et al., "Performance Evaluation of Programmable Graphics Hardware for Image Filtering and Stereo Matching", VRST '03 Proc., Oct. 1-3, 2003, Osaka, Japan, pp. 176-183, XP-002336211.

* cited by examiner

*Primary Examiner*—Kee M. Tung
*Assistant Examiner*—Antonio Caschera
(74) *Attorney, Agent, or Firm*—Blakely, Sokoloff, Taylor & Zafman LLP (57) ABSTRACT

A system, method and apparatus to provide flexible texture filtering. A programmable texture filtering module is introduced into the graphics processing pipeline of a graphic coprocessor and graphic processor integrated with the host. A program from a defined instruction set may then be loaded into texture processing cores to process texture data consistent with the program.

21 Claims, 4 Drawing Sheets

METHOD AND MECHANISM FOR PROGRAMMABLE FILTERING OF TEXTURE MAP DATA IN 3D GRAPHICS SUBSYSTEMS

RELATED APPLICATION

This application is a continuation of U.S. application Ser. No. 10/747,966, filed Dec. 29, 2003, currently pending.

BACKGROUND

1. Field of the Invention

The embodiments of the invention relate to computer graphics. More specifically, embodiments of the invention relate to processing of texture map data.

2. Background

Graphics applications, and particularly three dimensionally (3D) graphics applications have long been one of the most processing intensive activities performed by personal computers. To improve graphics processing capabilities, graphics co-processors have proliferated and are widely available on most modern day personal computers. Graphics coprocessors are specialized integrated circuits designed to quickly perform processing intensive tasks required by graphic applications.

The transformation of scene information (source data) into 3D images (display output) requires a number of operations. These operations in aggregate are referred to as a 3D graphics rendering pipeline. The operations performed by the pipeline can be grouped into certain fundamental functionalities. One of these functionalities is texture mapping. Texture mapping is a process in which the one, two or three dimensional image representing an object surface properties (such as appearance, reflectivity, or other such properties) is applied to a three dimensional mesh representing the object in a final rendering. While a two dimensional image is most commonly used, other dimensionalities are possible.

It is frequently the case when a texture image is applied to an object in a final rendering, there is disparity between a number of sample texture elements (texels) and the source texture image and the number of picture elements (pixels) to which the image is mapped. When the number of texels in a given range is less than the number of pixels, then the texture is required to be upsampled. When upsampling a texture, a scheme must be used to fill intermediate values. This scheme is referred to herein as "texture filtering" and has largely been performed by a fixed function state machine.

Most current graphics coprocessor support four types of texture filtering; point sampling, bilinear filtering, trilinear filtering and anisotropic filtering. As the filtering methods become increasingly complex, the state machine required to perform them becomes increasingly complex and requires increased real estate within the graphics coprocessor. This coupled with the fact that uses for texture data continues to expand, for example, texture data is being used for lighting and other surface properties in addition to color, renders the commonly employed linear interpolation inefficient or even insufficient.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1A:
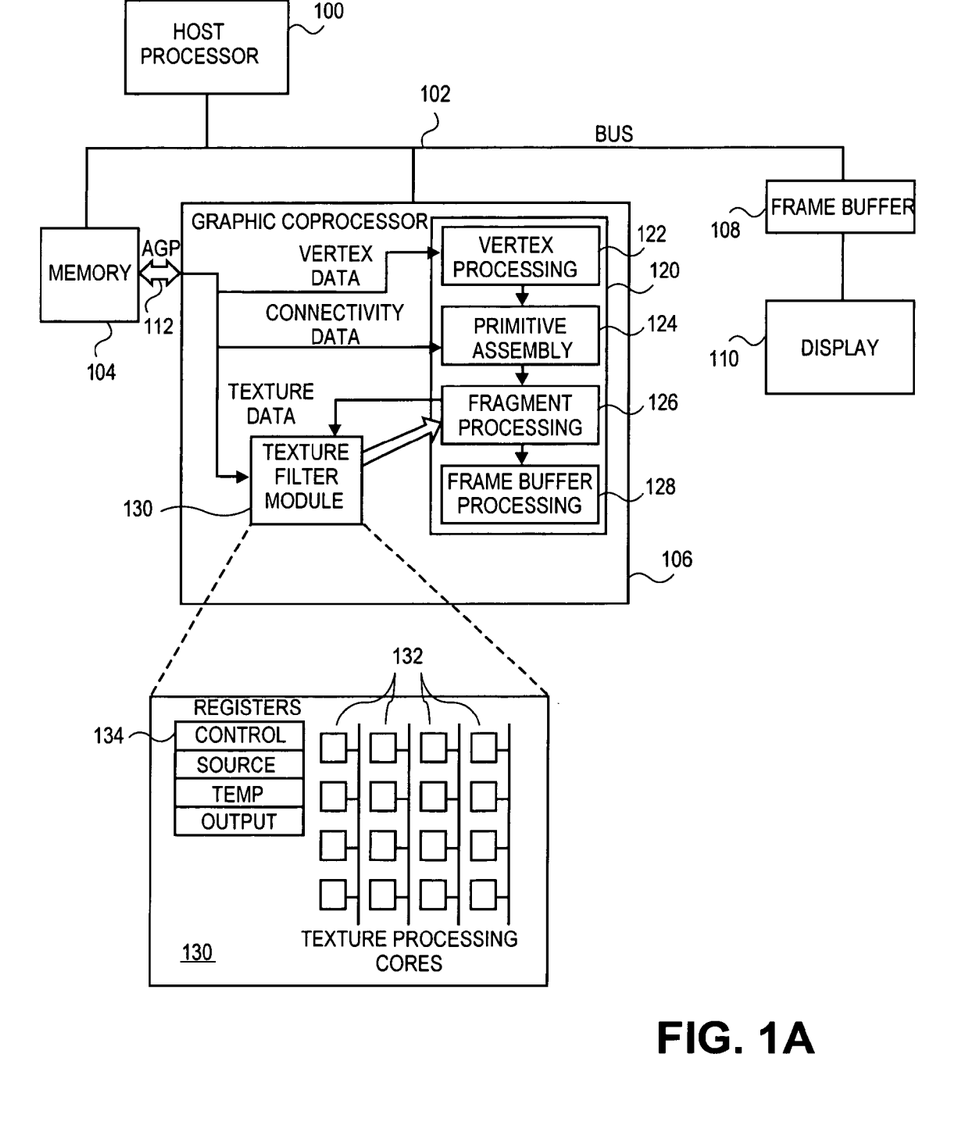
FIG. 1A is a block diagram of a system of one embodiment of the invention.

FIG. 1A is a block diagram of a system of one embodiment of the invention. A host processor 100 is coupled by a bus 102 to a memory 104. A graphics coprocessor 106 is also coupled to the bus 102. Additionally, graphics coprocessor 106 may be coupled to memory 104 by an accelerated graphics port (AGP) 112. The AGP may adhere to Accelerated Graphics Port AGP V3.0 Interface Specification Rev. 1.0 published September 2002 (hereinafter the AGP Specification). AGP 112 allows rapid access to graphics data residing in memory 104. Also coupled to the bus are framebuffer 108 and display 110. In some embodiments, framebuffer 108 may be contained within memory 104. Graphics coprocessor 106 includes pixel processing pipeline 120. Within the pixel processing pipeline 120 is a vertex processing module 122, primitive assembly module 124, a fragment processing module 126 and a framebuffer processing module 128. Vertex processing module 122 in operation receives vertex data, which may include, for example, 3D positional information, color information and other similar information related to vertices in the graphic image. In one embodiment, vertex data is of the form V=X, Y, Z, $T_u$, $T_v$, RGB. In this expression, X, Y, Z are the three dimensional Cartesian coordinates of the vertex, $T_u$ and $T_v$ are the two dimensional coordinate of the corresponding texel in the texture map and RGB are the red, green and blue color values at the vertex. Other forms and contents of vertex data are also contemplated.

Vertex processing module does three-dimensional transformations on 3D positional data conveyed, and may, for example, apply lighting. The processed vertices are passed to the primitive assembly module, which receives connectivity data. The connectivity data may include indices to permit assembly of primitives, typically triangles, based on the vertices and indices received.

The primitives are passed to the fragment processing module 126 which processes the primitives to identify fragments and apply texture data to build an output. As used herein, "fragment" refers to a pixel or group of contiguous pixels that are to be consistently processed to generate the output. The fragment processing exchanges data relating to texture mapping the fragments with a texture filter module 130.

The texture filter module 130 communicates with fragment processing module 126 to supply texels for application to the pixels. In one embodiment, texture filter module 130 is programmable. In this context, programmable is deemed to mean capable of executing a software program consisting of one or more instructions from a defined instruction set. One example of an instruction set is set forth below in Table 1.

TABLE 1

| Instruction | Description |
| --- | --- |
| ADD A, B | Adds A and B operands |
| SUB A, B | Subtracts B from A |
| MUL A, B | Multiples A by B |
| RCP A, B | Makes A the reciprocal of B |
| CMP A, B, X | Compares A, B according to immediate X, places result in A |
| MIN A, B | Compares A, B leaves minimum of two values in A |
| MAX A, B | Compares A, B leaves maximum of two values in A |
| MOV A, B | Moves B into A |

Alternative instruction sets, either shorter or longer, may be employed in various embodiments of the invention.

In one embodiment, texture filter module 130 includes a plurality of texture processing cores (TPCs) 132 (16 TPC are shown in FIG. 1A). Other embodiments may have more or fewer TPCs. In one embodiment, a single TPC exists. In one embodiment, each TPC 132 is capable of processing a pixel in parallel with each of the other TPC 132. Each core 132 may be provided with a register set 134 which may include various types of registers such as control registers, source registers, temporary registers and an output register.

In one embodiment, the control registers include a sampling register, a status register, an address register, an offset register, and a plurality of fraction registers. In one embodiment, the sampling register has one bit corresponding to each source registers indicating whether the source register should be sampled or not. For example, if there are sixteen source registers, the sampling register may be a sixteen bit register with one bit corresponding to each of the sixteen source registers. In one embodiment, the status register is used to indicate the status of the TPC after certain conditions, such as overflow, divide by zero, etc. In one embodiment, the address register may be a 32 bit register containing the address of the texture map data. In one embodiment, this register may be accessible only by an application programming interface (API) rather than providing direct access to a programmer. The offset register may be used to provide an offset into the texture data corresponding to the nearest texel coordinate. Fraction registers may be used to hold the fractional coordinate between the texel samples in each dimensionality. In one embodiment, these would be provided by the fragment processing module 126. In one embodiment above, where V=X, Y, Z, $T_u$, $T_v$, RGB; $T_u$ and $T_v$ correspond to a pixel to be texture mapped would be provided to the texture filtering module. As one example, an eight pixel one dimensional texture coordinate of 0.175 would fall between the second (0.125) and third (0.25) texel. It would equate to a fraction of 0.2. The fraction in this embodiment is found as (0.175−0.125)/0.125 or more generally, the coordinate less the closest lower increment divided by the increment value.

Figure 1B:
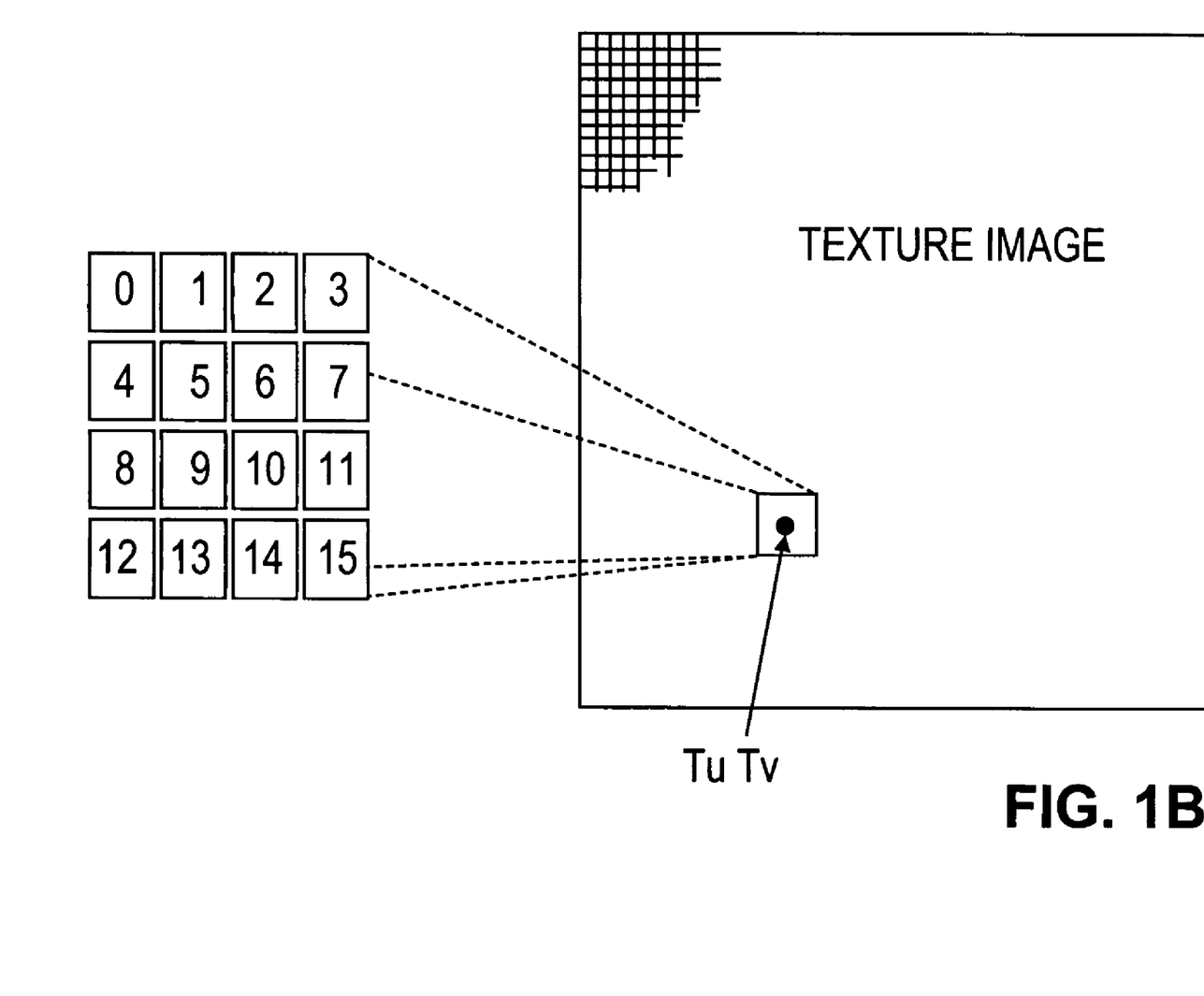
FIG. 1B is a diagram of texture sampling in one embodiment of the invention.

FIG. 1B is a diagram of texture sampling in one embodiment of the invention. In one embodiment, sixteen source registers are provided. In one embodiment, each register corresponding to one texel in a 4×4 grid surrounding the $T_u T_v$ sampling location of the texture sample point and would correspond to pixels addressed in such a fashion. While $T_u T_v$ may map to a location between texels 5 and 6 and texels 9 and 10, the contribution of the sixteen texels in the patch to the texture value assigned to $T_u T_v$ may be defined by the texture filtering program. In some embodiments, only texels 5, 6, 9 and 10 provide a contribution. In other embodiments, all sixteen texels may contribute. In still other embodiments, all diagonal pixels in the group may contribute. As illustrated, the programmable nature of the texture filtering module permits robust and flexible texture filtering options.

Temporary registers may be provided for optional use by a programmer performing intermediate calculations on sample data. An output register is provided to store the output once the filtering operation is complete. In one embodiment, a 32 bit register is provided to receive the final result. Larger registers may be employed, however, in some embodiments a 32 bit ARGB (alpha red green blue) value is deemed sufficient.

The actual filtering may be performed by the texture filtering module 130 by loading a desired filtering program into a textured processing core. The filtering program corresponds to a fragment to be processed. Within a region of an image, it may be desirable to apply various effects to the texture data accordingly. Thus, for a particular graphic image, there may be numerous filtering programs employed.

For example, the filter program applied to a shiny part of a leather jacket on an image would likely to be different than the filter program applied to a scuffed part of a leather jacket. By using different programs in the texture filter module, the different effect can be accommodated. The usage of several filter programs during the course of rendering a given scene image is analogous to how, under the current-day fixed-function schemes, the rendering of a given scene may involve switching between the different fixed-function filtering states for different parts of the scene.

The program employed will influence which of the e.g. 16 texels are actually sampled to perform the texture filtering. In one embodiment, texture data may be arranged in memory to optimize access to the texels likely to be sampled. For example, if the sampling register indicates every fourth texel value is active, the texture data may be stored so that points 1, 5, 9 and 13 are contiguous in memory, points 2, 6, 10, etc. are contiguous. As another example, where every second texel is active, 1, 3, 5, 7, etc. are contiguous and 2, 4, 8, etc. are contiguous. This arrangement in memory may be performed by the host processor 100 or the graphic coprocessor 106.

Arranging memory requires a certain amount of processor resources, in one embodiment, a determination is made when the likely use of the texture data exceeds a threshold cost required to rearrange it. Thus, where the usage of the textured data justifies the cost to rearrange it, in one embodiment, the textured data is rearranged in memory to facilitate access. The threshold may be selected based on objective guidelines such as number of texels to be processed with a given program.

Once texture filtering is complete and the output generated, the output value may then be passed back to fragment processing module 126 to permit the output fragment to be built. The output built by the fragment processing module 126 is passed to framebuffer processing module 128. Framebuffer processing module 128 combines the pixels received with the existing framebuffer for output to display 110.

Figure 2:
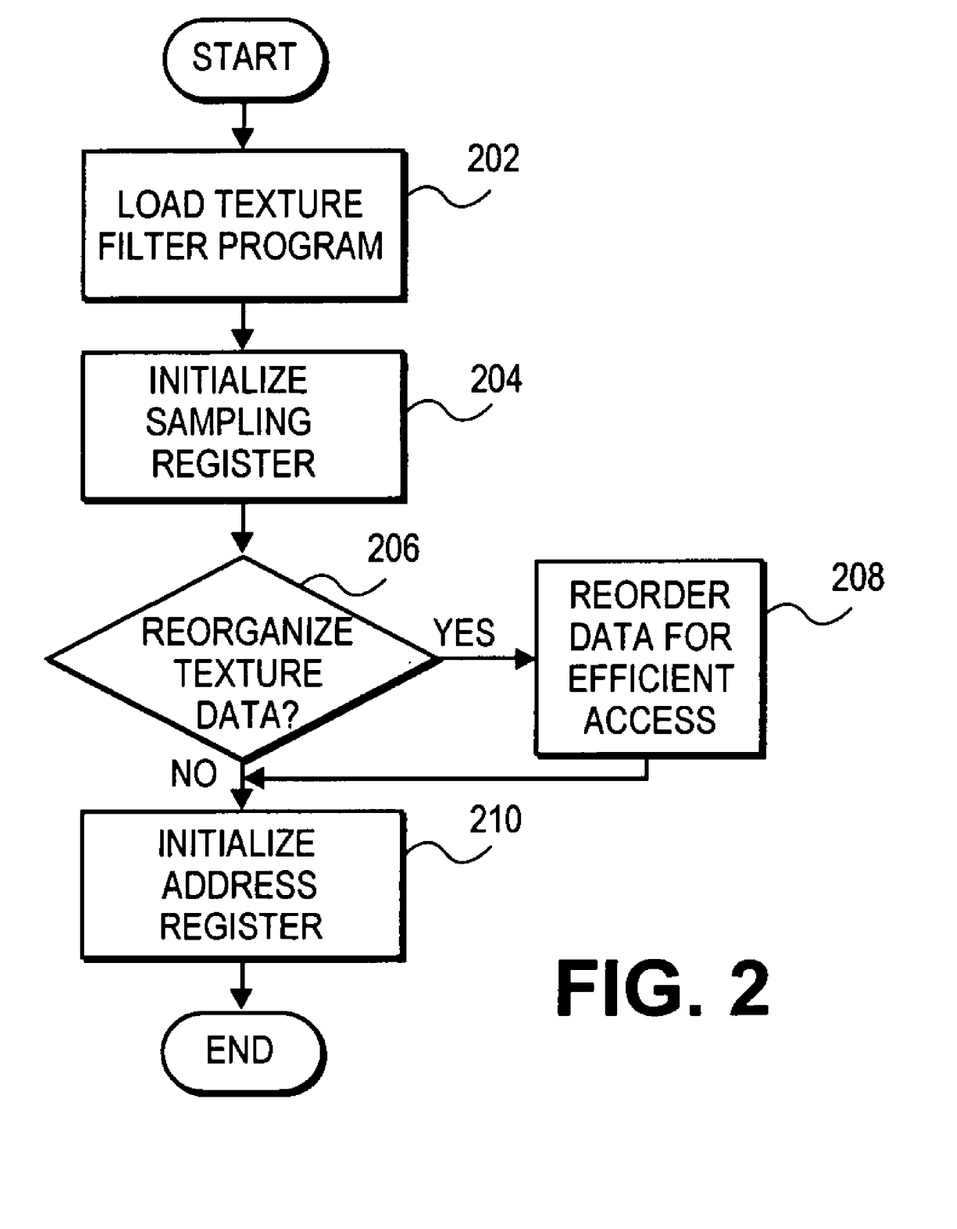
FIG. 2 is a flow diagram of the setup of the textured filtering module in one embodiment of the invention.

FIG. 2 is a flow diagram of the setup of the textured filtering module in one embodiment of the invention. At functional block 202, a texture filter program is loaded into a texture processing core of the texture filtering module. At functional block 204, the sampling register is initialized to indicate the texels surrounding a sample point that will be sampled as part of the filtering process. At decision block 206, a determination is made if the texels to be sampled in conjunction with the number of samplings required justify reorganization of the texture data in memory. If so, the texture data is reordered for efficient access at functional block 208. After reordering, or if no reordering is required, the address register is initialized at functional block 210.

Figure 3:
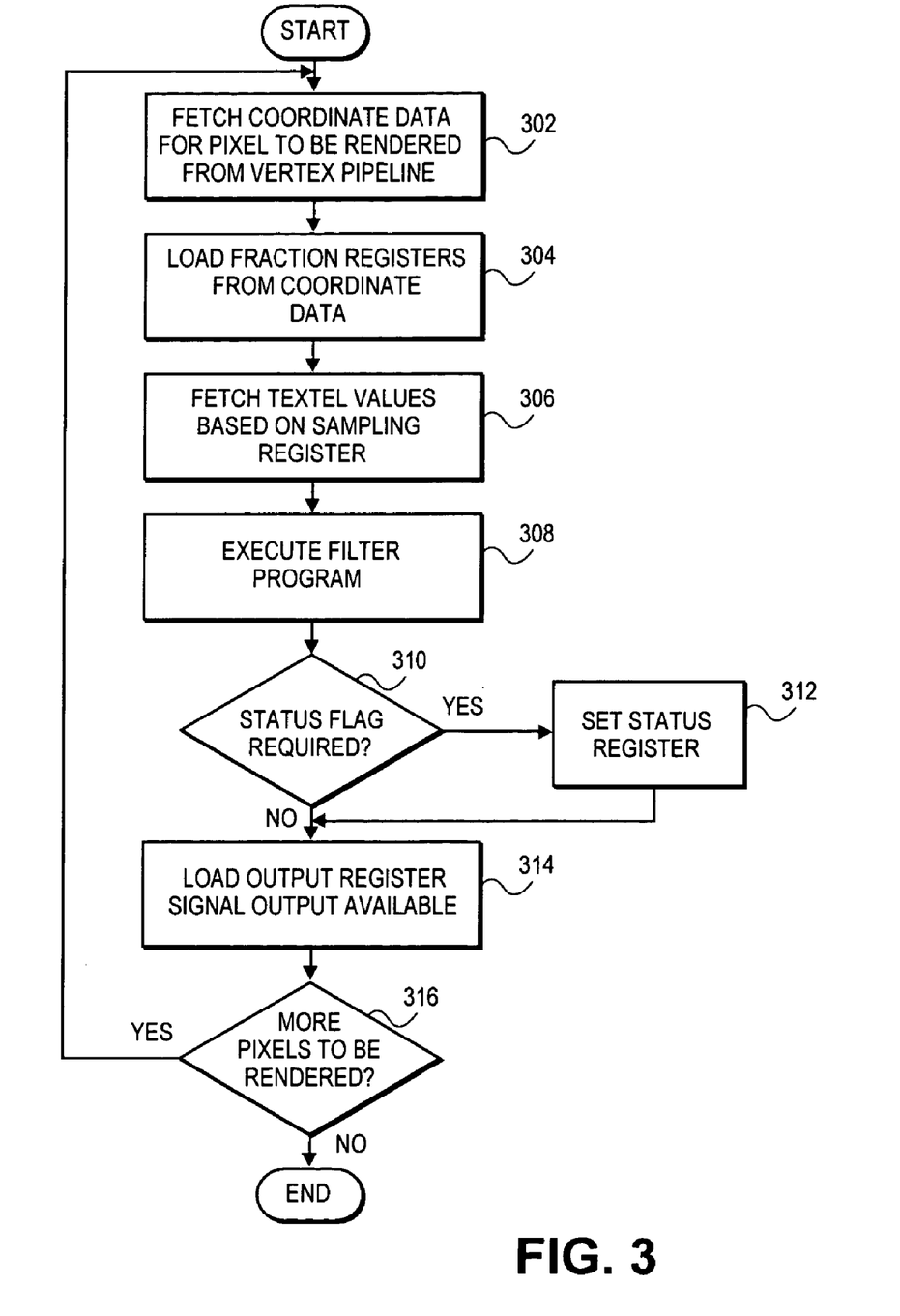
FIG. 3 is a flow diagram of texture filtering in one embodiment of the invention.

FIG. 3 is a flow diagram of texture filtering in one embodiment of the invention. At functional block 302, the texture filter fetches the coordinate data for pixels to be rendered from the vertex pipeline. In one embodiment, these will be fetched from the fragment processing module. At functional block 304, texel values identified from the sampling register are fetched from memory. At functional block 306, fraction registers are loaded with the coordinate data. The texture processing cores are used to execute a filter program at functional block 308. At decision block 310, a determination is made if the execution of the filter program necessitates setting of a status flag. If the execution requires the status flag such as a divide by zero or overflow, the status register is loaded with an appropriate value at functional block 312. If no status flag is required, or after the status register has been loaded, the output value is loaded into the output register and the output is signaled to be available at functional block 314. At decision block 316, a determination is made if there are more pixels to be rendered using the existing filter program. If so, a flow continues. If not, it ends.

Although the above flow diagrams are arranged in a particular order, it should be understood that some of the operations may be performed in parallel or in a different order than depicted. Accordingly, such parallization or rearrangement is within the scope and contemplation of the embodiments of the invention. It should also be noted that while in only one embodiment, a single texture processing core may be present in the texture filter module, embodiments with multiple texture processing cores, pixels may be processed in parallel with each core following the flow depicted in FIG. 3.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A method comprising:
fetching coordinate data for a pixel to be rendered;
fetching texel values corresponding to the pixel;
filtering the texel values through a programmable filters module including a plurality of source registers and a plurality of control registers including one sampling register including a bit corresponding to each of the source registers to indicate if sampling of a corresponding source register is required; and
outputting a filtered texture value for the pixels.

2. The method of claim 1 wherein fetching coordinate data comprises:
retrieving X, Y, Z coordinate data train a vertex pipeline.

3. The method of claim 1 further comprising:
writing coordinate fraction data to a plurality of registers.

4. The method of claim 1 wherein outputting comprises:
writing the filtered texture value to a register; and
signaling a processor that the filtered texture value is available.

5. The method of claim 1 wherein filtering texel values comprises:
reading a control register; and
using at least one location specified in the control register as a source location.

6. An apparatus comprising:
a fragment processing module;
a programmable texture filtering module in communication with the fragment processing module to programmably filter texture data corresponding to at least one pixel; and
a frame buffer processing module to combine filtered texture data with and existing frame buffer; wherein the programmable texture filtering module comprises:
a plurality of control registers;
a plurality of source registers; and wherein the plurality of the control registers comprise: at least one sampling register having a bit corresponding to each of the source registers to indicate if sampling of a corresponding source register is required.

7. The apparatus of claim 6 wherein the programmable texture filtering module further comprises:
a plurality of temporary registers; and
at least one output register.

8. The apparatus of claim 7 wherein the source registers are read only.

9. The apparatus of claim 7 wherein the plurality of control registers comprises:
a status register;
an address register;
an offset register; and
a plurality of fraction registers.

10. The apparatus of claim 6 wherein the programmable texture filtering module comprises:
a plurality of processing cores to execute an instruction set.

11. The apparatus of claim 6 wherein a subset of the plurality of cores are to execute a filtering program on at least one pixel in parallel.

12. A system comprising:
a memory;
a plurality of texture processing cores (TPC) coupled to the memory to programmably inter texture data;
a fragment processing module to apply the filtered texture data to at least one fragment; and
a display to display an image created using the at least one fragment;
wherein the TPC comprises:
a plurality of control registers; and where the plurality of the control registers comprise:
at least one sampling register having a bit corresponding to each of the source registers to indicate if sampling of a corresponding source register is required.

13. The system of claim 12 wherein the plurality of TPC and the fragment processing module are integrated with a host processor.

14. The system of claim 12 wherein the plurality of TPCS and the fragment processing module reside in a graphics coprocessor.

15. The system of claim 14 further comprising:
an accelerated graphics port coupling the graphics coprocessor to the memory.

16. The system of claim 12 comprising:
a register set associated with each TPC of the plurality.

17. A computer readable storage media containing executable computer program instructions which when executed cause a digital processing system to perform a method comprising:
fetching coordinate data for a pixel to be rendered;
fetching texel values corresponding to the pixel;

filtering the texel values through a programmable filter module including
a plurality of source registers; and
a plurality of control registers including at least one sampling register including a bit corresponding to each of the source registers to indicate if sampling of a corresponding source register is required; and
outputting a filtered texture value for the pixel.

18. The computer readable storage media of claim 17 which when executed cause a digital processing system to perform a method further comprising:
retrieving X, Y, Z coordinate data from a vertex pipeline.

19. The computer readable storage media of claim 17 which when executed cause a digital processing system to perform a method further comprising:
writing coordinate fraction data to a plurality of registers.

20. The computer readable storage media of claim 17 which when executed cause a digital processing system to perform a method further comprising:
writing the filtered texture value to a register; and
signaling a processor that the filtered texture value is available.

21. The computer readable storage media of claim 17 which when executed cause a digital processing system to perform a method further comprising:
reading a control register; and
using at least one location specified in the control register as a source location.

* * * * *

UNITED STATES PATENT AND TRADEMARK OFFICE
CERTIFICATE OF CORRECTION

| | | |
|---|---|---|
| PATENT NO. | : 7,133,047 B2 | Page 1 of 1 |
| APPLICATION NO. | : 10/872049 | |
| DATED | : June 18, 2004 | |
| INVENTOR(S) | : Pallister | |

It is certified that error appears in the above-identified patent and that said Letters Patent is hereby corrected as shown below:

In Column 5, at line 56, delete "train" and insert --from--.

In Column 6, at line 38, delete "inter" and insert --filter--.

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,133,047 B2
APPLICATION NO. : 10/872049
DATED : November 7, 2006
INVENTOR(S) : Pallister It is certified that error appears in the above-identified patent and that said Letters Patent is hereby corrected as shown below:

In Column 5, at line 56, delete "train" and insert --from--.

In Column 6, at line 38, delete "inter" and insert --filter--.

This certificate supersedes Certificate of Correction issued April 3, 2007.

Signed and Sealed this

Eighth Day of May, 2007

JON W. DUDAS
*Director of the United States Patent and Trademark Office*